US012801733B2

(12) United States Patent
Hazan et al.

(10) Patent No.: US 12,801,733 B2
(45) Date of Patent: Nov. 17, 2026

(54) COLLECTIVE LEAKAGE DETECTION IN RETRIEVAL AUGMENTED GENERATION (RAG)

(71) Applicant: Intuit Inc., Mountain View, CA (US)

(72) Inventors: Itay Hazan, Beer Sheva (IL); Ron Bitton, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 64 days.

(21) Appl. No.: 18/932,455

(22) Filed: Oct. 30, 2024

(65) Prior Publication Data

US 2026/0119651 A1 Apr. 30, 2026

(51) Int. Cl.
*G06F 21/00* (2013.01)
*G06F 21/55* (2013.01)

(52) U.S. Cl.
CPC .................................. *G06F 21/554* (2013.01)

(58) Field of Classification Search
CPC ..................................................... G06F 21/554
See application file for complete search history.

(56) References Cited

U.S. PATENT DOCUMENTS 8,478,780 B2 7/2013 Cooper et al.
2010/0205180 A1* 8/2010 Cooper .................. G06N 20/00 707/769
2019/0188295 A1* 6/2019 Sirotkovic .......... G06F 16/2425
2020/0410091 A1* 12/2020 Kimon .................. G06F 21/554
2024/0265041 A1 8/2024 Rennie et al.
2025/0028853 A1* 1/2025 Dupont ............... G06F 21/6227
2025/0103746 A1* 3/2025 Gharibi ............... G06F 21/6227
2025/0238470 A1* 7/2025 Penta .................... G06F 16/907
2026/0025396 A1* 1/2026 Hussain .............. H04L 63/1425

OTHER PUBLICATIONS

Carlini, Nicholas, “Extracting Training Data from Large Language Models,” arXiv:2012.07805v2 [cs.CR] Jun. 15, 2021, 19 pages.
Zeng, Shenglai, The Good and The Bad: Exploring Privacy Issues in Retrieval-Augmented Generation (RAG), RAG? arXiv:2402.16893v1 [cs.CR] Feb. 23, 2024, 18 pages.

* cited by examiner

*Primary Examiner* — Michael M Lee
(74) *Attorney, Agent, or Firm* — Paradice & Li LLP

(57) ABSTRACT

A collective data leakage attacks on a Retrieval-Augmented Generation (RAG) application for a generative artificial intelligence (GenAI) application is detected and prevented based on an analysis of incoming queries to distinguish normal and potentially malicious querying behavior. Similarity distances associated with each query are determined, such as the distances between the query vector embeddings and the nearest neighbors in the vector embedding space, distances between each query vector embedding and other query vector embeddings for other queries from the same user, or distances between each query vector embedding and the nearest neighbor cluster of vector embeddings in the vector space. A data leakage attack on the RAG application may be determined based on the similarity distances associated with each query. In response to the identification of a potential data leakage attack, the release of data from the RAG application may be halted.

20 Claims, 7 Drawing Sheets

COLLECTIVE LEAKAGE DETECTION IN RETRIEVAL AUGMENTED GENERATION (RAG)

TECHNICAL FIELD

This disclosure relates generally to Retrieval Augmented Generation (RAG) for Large Language Models (LLMs), and specifically to security measures against data leakage attacks.

BACKGROUND

Information retrieval is the task of identifying and retrieving information system resources that are relevant to an information need. Large language models (LLMs) are computational models that are trained using vast amounts of text during a self-supervised and semi-supervised training process to be capable of language generation or other natural language processing tasks. Retrieval-Augmented Generation (RAG) is the process of optimizing the output of a LLM to enable the LLM to reference a knowledge base external to the training data sources for the LLM. A RAG application may be used to extend the capabilities of LLMs to specific domains or an organization's internal knowledge base that is present in the retrieval database of the RAG application without retraining the LLM on the retrieval database. For example, in response to a given query, RAG uses a document retriever to retrieve the most relevant data, e.g., information or documents, from a retrieval database. The retrieved data is combined with the query and provided as an input to the LLM. The LLM uses its pre-trained knowledge and the retrieved data to generate a response to the query.

The retrieval used by the RAG application may be private as the specific domains or knowledge base contained within the retrieval database may be proprietary or may include confidential, private data. Legitimate users of the RAG application may be allowed to see or access small portions of the knowledge base in response to a user query, but access to the entire retrieval database is typically prohibited due to proprietary or privacy issues. Accordingly, the retrieval database used by the RAG application may not be fully accessible to the public. The contents of a private retrieval database used for retrieval in a RAG application, however, may be vulnerable to collective leakage attacks. In a collective leakage attack, an attacker attempts to bypass accessibility restrictions to the retrieval database by submitting multiple user queries that aim to covertly cover as much data space in the retrieval database as possible. Each of the user queries submitted by the attacker may access only a small portion of the knowledge base in the retrieval database, but collectively, the multiple user queries may improperly extract a large amount of data from a proprietary retrieval database. Security measures to detect and prevent leakage attacks on a RAG application are necessary to safeguard the sensitive data that may be contained within the retrieval database.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

A collective data leakage attacks on a Retrieval-Augmented Generation (RAG) application for a generative artificial intelligence (GenAI) application is detected and prevented based on an automatic analysis of each incoming query. The normal and potentially malicious querying behavior, for example, may be identified from incoming query patterns based on similarity distances between the query vector embedding for each query to the nearest neighbor vector embedding retrieved in response to the query by the RAG application. The similarity distances associated with the query vector embeddings may be used to determine whether the queries from a user are improperly attempting to extract unrelated data from different regions of the retrieval database or legitimately attempting to retrieve specific information from the retrieval database. For example, in some implementations, similarity distances between queries from the same user or distances between queries and the nearest neighbor cluster of vector embeddings in the vector space may be analyzed, e.g., to determine whether the queries are an improper attempt to probe different regions of the retrieval database. If a potential data leakage attack is identified, proactive security measurements may be enabled, such as halting the release of data from the RAG application to the attacker.

One innovative aspect of the subject matter described in this disclosure can be implemented as a method of preventing collective data leakage attacks on a Retrieval-Augmented Generation (RAG) application for a generative artificial intelligence (GenAI) application. The method may include receiving a plurality of user queries from one or more users via an electronic interface and converting user queries into query vector embeddings. The method may further include determining a similarity distance between each query vector embedding and one or more nearest neighbor vector embeddings for data stored in an embedding space of the RAG application. Details about each of the plurality of user queries for each user are logged. The details may include an identifier of each user and the similarity distance between each query vector embedding and the one or more nearest neighbor vector embeddings. A data leakage attack on the RAG application is identified based on at least the similarity distance between each query vector embedding and the one or more nearest neighbor vector embeddings for a plurality of queries from one or more users. The method further includes responding to the data leakage attack on the RAG application by preventing a release of data from the RAG application to the one or more users.

One innovative aspect of the subject matter described in this disclosure can be implemented as a system configured for preventing collective data leakage attacks on a Retrieval-Augmented Generation (RAG) application for a generative artificial intelligence (GenAI) application. The system may include one or more processors and at least one memory coupled to the one or more processors and storing instructions that, when executed by the one or more processors, cause the system to perform various operations. The operations may include receiving a plurality of user queries from one or more users via an electronic interface and converting user queries into query vector embeddings. The operations may further include determining a similarity distance between each query vector embedding and one or more nearest neighbor vector embeddings for data stored in an embedding space of the RAG application. The system is configured to log details about each of the plurality of user queries for each user are logged. The details may include an identifier of each user and the similarity distance between each query vector embedding and the one or more nearest neighbor vector embeddings. The system is further configured to identify a data leakage attack on the RAG application based on at least the similarity distance between each query vector embedding and the one or more nearest neighbor vector embeddings for a plurality of queries from one or more users and to respond to the data leakage attack on the RAG application by preventing a release of data from the RAG application to the one or more users.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
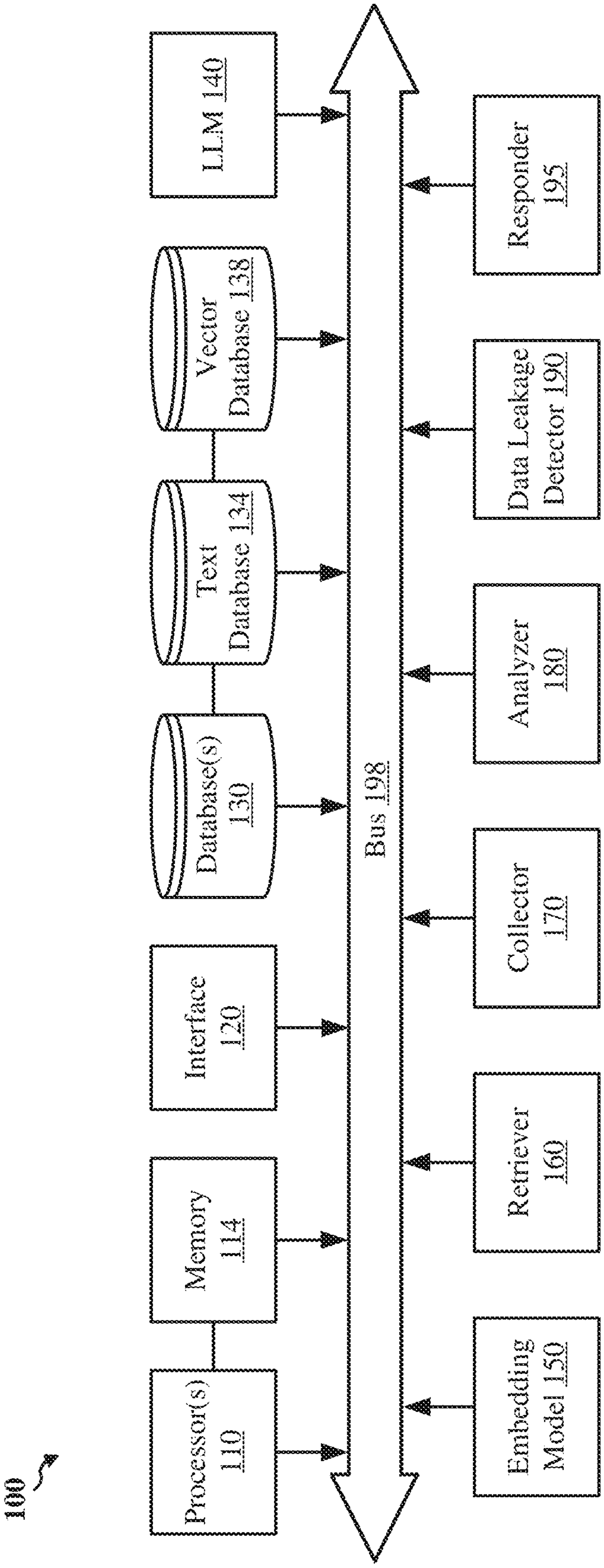
FIG. 1 illustrates a system, according to some implementations.

Retrieval-Augmented Generation (RAG) application is used to optimize the output of generative artificial intelligence (GenAI) application, such as a Large Language Model (LLM), so that it references an authoritative knowledge base that is otherwise outside the training data sources for the LLM. The knowledge base is contained within a retrieval database, which may be considered proprietary or otherwise contain sensitive data. While it may be permissible for subsets of the data from within a retrieval database to be retrieved with the RAG application and accessed by legitimate users, it may be desirable to otherwise restrict access to the contents of the retrieval database from the public. Collective leakage attacks on RAG applications may be used to systematically extract the contents of the retrieval database through user queries. Using a series of specifically crafted queries, for example, attackers may attempt to extract the data from the retrieval database.

As discussed herein, proprietary retrieval databases may be protected by detecting the queries used in a collective leakage attack so that the information retrieved in response to these queries is not disclosed to attackers. Once an attacker is identified based on the queries, appropriate action may be taken to stop or at least reduce the risk of leakage from the retrieval database.

As discussed herein, an automated analysis of incoming query patterns is used to detect an attack. Attackers conducting a collective leakage attack, for example, may use queries that are intended to covertly cover as much data space in the retrieval database as possible to maximize data extraction. This results in query patterns that will differ significantly from a typically legitimate user queries, in terms of the areas of the retrieval database that is targeted as well as the similarity distances from the retrieved results to their nearest neighbors within the retrieval database.

Implementations discussed herein, for example, assess user queries by analyzing the similarity distances of the queries to their retrieved results to distinguish between normal and potentially malicious querying behavior. For example, if the queries consistently retrieve results that are unusually distant, this may serve as an indicator of a possible collective leakage attempt, enabling proactive security measures to mitigate such threats. The user queries may be further analyzed based on the regions of the retrieval database queried. For example, if the queries consistently attempt to retrieve data from distant or unrelated areas in the retrieval database, this may serve as another indication of a possible collective leakage attempt, enabling a proper response to protect the retrieval database from the attack.

As discussed herein, several components operate together to enhance the security measures against collective data leakage attacks of RAG applications that are used with GenAI applications. For example, a data collection component is used to capture relevant details for each incoming query, such as the source, frequency, and timings. A data analysis component processes the query vector embedding to determine the similarity distances between the query and its K nearest neighbors in the RAG embedding space. The distance between queries and their retrieved results, for example, may be determined based on a distance measurement between the query vector embeddings and the K nearest neighbors in the RAG embedding space, e.g., employing cosine, Euclidean, or Manhattan distances. The similarity distance for each query may be used to assess, e.g., how each query aligns with the typical, i.e., non-malicious, queries, or the data distribution within the retrieval database. A data leakage detection component may be designed to identify outlier queries, which may be indicative of exploratory or manipulative behaviors consistent with a data leakage attempt. The decision making component may use additional information, such as a blend of historical data that includes examples of normal user interactions as well as confirmed incidences of data breaches to identify a data leakage attempt. The decision making component, for example, may leverage supervised learning techniques to distinguish between normal and suspicious query patterns. The decision making component may evaluate key features such as distance metrics from nearest neighbors, the prevalence of queries in typically sparse regions, and anomalies in query characteristics or volumes. Depending on the complexity of the patterns and the data, various algorithmic approaches such as decision trees, support vector machines, or neural networks may be used. In another implementation, a more simplistic approach may be used by the decision making component, such as the use of a set distance threshold to the K nearest neighbors. When a potential data leakage attack is identified, a response component is activated. The response component may be preconfigured with a range of response strategies to quickly counteract detected threats. Depending on the nature and severity of the anomaly, the responses may include halting suspicious queries, limiting query rates from certain users or IP ranges, or escalating the issue to system administrators for further action. Together, these components may not only detect but may also proactively respond to potential data leakage attempts, furnishing the RAG applications with robust, intelligent defenses that adapt to the ever-changing landscape of cybersecurity threats. This approach significantly strengthens the security framework, enabling secure, uninterrupted operation of RAG applications in varied applications. This architecture ensures that the system not only adapts to the current security landscape but is also prepared for future challenges, creating a resilient defense mechanism against sophisticated data threats.

Aspects of the subject matter disclosed herein for preventing collective data leakage attacks on a RAG application for a GenAI application, such as LLM, are not a mental process that can be performed in the human mind, for example, because the human mind is not practically capable of generating multi-dimensional vector embeddings, or practically capable of determining similarity distances between query vector embeddings and vector embeddings of nearest neighbor vector embeddings in a vector space. Moreover, various aspects of the present disclosure provide a technical solution to a technical problem that is rooted in computer technology, and specifically related to detecting and preventing malicious attacks on RAG applications. As discussed herein, RAG applications suffer from the technical problem of being vulnerable to leakage attacks by which data from a proprietary retrieval database is improperly extracted and stolen. The technical solution provided by the present disclosure includes identifying potential leakage attacks on a RAG application from characteristics of user queries, such as the similarity distances between query vector embeddings and vector embeddings of nearest neighbor vector embeddings in a vector space to distinguish normal and suspicious query patterns and preventing the release of data from the retrieval database. The various aspects of the data leakage prevention system discussed herein are integrated into a practical application including improving the security of RAG applications.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for generating search results. Implementations of the subject matter disclosed herein provide specific inventive steps describing how desired results are achieved and realize meaningful and significant improvements on existing computer functionality—that is, the performance of computer-based systems operating in the evolving technological field of generating search results.

FIG. 1 shows a system 100, according to some implementations. Various aspects of the system 100 disclosed herein are generally applicable for RAG applications with a generative artificial intelligence (GenAI) application with data leakage detection and prevention. The system 100 includes a combination of one or more processors 110, a memory 114 coupled to the one or more processors 110, an interface 120, one or more databases 130, a text database 134, a vector database 138, a large language model (LLM) 140, an embedding model 150, a retriever 160, a collector 170, an analyzer 180, a data leakage detector 190, and a responder 195. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device of a user, outputting data (e.g., over the communications network) to the computing device of the user, providing a search interface for the user, outputting search results to the computing device of the user, and the like. Specifically, the interface 120 may be used to receive queries from users and/or to provide results to users. For example, the interface 120 may be used to receive a transmission (e.g., including a query entered by a user of the GenAI system) over the communications network from a computing device associated with the user. As another example, the interface 120 may be used to transmit one or more results over the communications network to the computing device associated with the user. The interface 120 may also be used to provide or receive other suitable information, such as computer code for updating one or more programs stored on the system 100, internet protocol requests and results, or the like. The interface 120, for example, may be used to provide a corpus of data, e.g., specific domains or knowledge base, for the retrieval database, e.g., stored in text database 134 and vector database 138, for the RAG application. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects, algorithms, weights, models, modules, engines, user information, values, ratios, historical data, recent data, current or real-time data, files, plugins, extracted data and/or metadata, arrays, tags, identifiers, prompts, queries, replies, feedback, insights, formats, characteristics, features, and/or components, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. The database 130 may store details associated with each user queries, including a user identifier, the query and/or query vector embedding, similarity distances associated with the query, and other contextual data, such as historical data related to the user, e.g., the number of queries, the frequency of queries, the timing of queries, indications of adversarial input in the query, user identifiers for other uses that share the same IP address, etc. In various implementations, the database 130 is a part of or separate from the text database 134, the vector database 138, and/or another suitable physical or cloud-based data store. In some implementations, the database 130 includes a relational database capable of presenting information as data sets in tabular form and capable of manipulating the data sets using relational operators.

The text database 134 stores the corpus of textual data for the retrieval database used by the RAG application, which may be considered proprietary. The text database 134 may store documents, articles, text snippets, sentences, JavaScript Object Notation (JSON) or YAML schemas, or any other item that is textual in nature. In various implementations, the text database 134 may be a part of or separate from the database 130 and/or the vector database 138. In some instances, the text database 134 includes data stored in one or more cloud object storage services, such as one or more Amazon Web Services (AWS)-based Simple Storage Service (S3) buckets. In some implementations, all or a portion of the data is stored in a memory separate from the text database 134, such as in the database 130, the vector database 138, and/or another suitable data store.

The vector database 138 stores data associated with vectorized data, such as vectorized versions of text stored in text database 134, vectorized versions of user queries, or any other suitable data associated with vectorized data. The vectorized data may be stored in the vector database 138 as dense vector fields in the form of a hierarchical navigable small world (HNSW) graph. In some implementations, the vector database 138 is an Elasticsearch vector database, or another suitable vector database, such as Pinecone, Milvus, Chroma, Weaviate, Deep Lake, Qdrant, Pgvector, Faiss, ClickHouse, Apache Solr, *Vespa*, Vald, OpenSearch, Apache Cassandra, or the like. In various implementations, the vector database 138 may be a part of or separate from the database 130 and/or the text database 134. In some instances, the vector database 138 includes data stored in one or more cloud object storage services, such as one or more Amazon Web Services (AWS)-based Simple Storage Service (S3) buckets. In some implementations, all or a portion of the data is stored in a memory separate from the vector database 138, such as in the database 130, the text database 134, and/or another suitable data store.

The LLM 140 may be any suitable generative artificial intelligence (AI) model trained on a large corpus of text to generate written responses, answer questions, and assist with various language-related tasks. To note, the LLM 140 may use various AI accelerators to process vast amounts of textual data (e.g., from the internet), utilize artificial neural networks (ANNs) with millions to billions or even trillions of weights or parameters, be trained through self-supervised and/or semi-supervised methods, incorporate one or more aspects of the transformer architecture and/or mixture of experts (MoE), operate in part based on predicting a next token or word from an input, perform various natural language processing (NLP) tasks, and include multiple layers of transformer blocks configured using aspects of deep learning to recognize and generate language patterns by processing the vast amounts of textual data using the billions or even trillions of parameters or weights. Example LLMs may include OpenAI's ChatGPT, Google's Bard (PaLM) and/or Google's Gemini, Meta's LLaMa, BigScience's BLOOM, Baidu's Ernie 3.0 Titan, Anthropic's Claude, or another suitable type of ML-based neural network compatible with prompt engineering techniques.

The embedding model 150 may be any suitable model architecture or ML-framework for generating vector embeddings using NLP techniques. Specifically, the embedding model 150 is configured to process input (e.g., sentences, paragraphs, etc.) to generate dense vector representations (or "embeddings") of the input. The dense vectors may be (e.g., fixed-sized) arrays of (e.g., floating-point) numbers—where each number represents a feature learned from the data—that can be used in various applications, such as search, clustering, information retrieval, and the like. In some implementations, the dense vectors are comprised of ones and zeroes. In some implementations, the embedding model 150 is a fine-tuned version of a transformer-based model, such as Bidirectional Encoder Representations from Transformers (BERT), Robustly Optimized BERT Pretraining Approach (ROBERTa), DistilBERT, XLNet, or another suitable model trained to output semantically meaningful sentence embeddings from sentence input by bringing embeddings of similar sentences closer together in a vector space while pushing dissimilar sentence embeddings further apart in the vector space. As one example, the embedding model 150 may be the open-source HuggingFace Sentence Transformer. The embedding model 150, for example, may be used to generate vector embeddings for the text stored in the vector database 138 and text database 134, as well as generate vector embeddings from user queries submitted via the interface 120.

The retriever 160 is configured to perform a nearest neighbor search or vector search to find the closest data points to a given query point in a high-dimensional vector space. The retriever 160 may implement an exhaustive brute-force search, an approximate nearest neighbor (ANN) search, or any other desired algorithm for nearest neighbor searches. The retriever 160 receives the query vector embeddings produced by the embedding model 150 in response to a user query received via the interface 120 and searches the vector database 138 for the nearest K embedding vectors. The retriever 160, for example, determines a similarity distance score for query vector embedding with respect to each vector embedding stored in the vector database 138 to determine the nearest neighbors, which are considered most relevant. The similarity distance may be determined using any desired distance metric, such as, but not limited to cosine distance, squared Euclidean distance, dot product, Manhattan distance, etc. For the K near neighbor vector embeddings, the retriever 160 retrieves the associated data from the text database 134 and may provide the retrieved data to the LLM 140 in ranked order.

The collector 170 collects and logs details associated with each user query received via the interface 120, which may be stored in database 130. The collector 170, for example, may collect and store a user identifier, the query and/or query vector embedding, similarity distances associated with the query, and other contextual data, such as historical data related to the user, e.g., the number of queries, the frequency of queries, the timing of queries, indications of adversarial input in the query, user identifiers for other uses that share the same IP address, etc.

The analyzer 180 processes the query vector embedding received from embedding model 150 in response to each user query received via the interface 120. The analyzer 180 may be used to determine similarity distance scores for each query vector embedding with respect to the vector embeddings of the K nearest neighbors, the similarity distance scores for each query vector embedding with respect to query vector embeddings from the same user, the similarity distance scores for each query vector embedding with respect cluster of datapoints in the vector space, etc. The similarity distance may be determined using any desired distance metric, such as, but not limited to cosine distance, squared Euclidean distance, dot product, Manhattan distance, etc. In various implementations, the analyzer 180 may be a part of or separate from the retriever 160.

The data leakage detector 190 identifies user queries that are potential data leakage attempts using the logged details for the user query. The data leakage detector 190 identifies outlier queries that may be indicative of exploratory or manipulative behaviors that is consistent with a data leakage attempt based on one or more similarity distances associated with each query, such as the similarity distance to the K nearest neighbors, the similarity distance to other queries from the user, the similarity distance to the nearest cluster of datapoints in the vector space. The data leakage detector 190, for example, may apply one or more thresholds to the similarity distances associated with each query to determine whether the query is an outlier from normal query behavior. The data leakage detector 190 may consider additional factors, such as the historical data for the user associated with the query, including the number of queries, the frequency of queries, the timing of queries, and whether adversarial input was detected in the query. The data leakage detector 190 may further consider queries from other users, such as different users having the same IP address or within a range of IP addresses as the source of the query. The additional factors, for example, may be used to alter the one or thresholds used to determine outlier query behavior. In some implementations, the data leakage detector 190 may be a machine learning model, such as one or more decision trees, support vector machines, or neural networks, trained to distinguish between normal and suspicious query patterns to identify possible collective leakage attacks. The model, for example, may be trained based on one or more types of similarity distances associated with queries from one or more users. Supervised learning techniques may be used to train the data leakage detector 190 model using known legitimate queries and malicious queries to distinguish between normal and suspicious query patterns. The data leakage detector 190 model may evaluate key features, such as the similarity distances, and may use additional key features, such as the historical factors as well as queries from other users to assist in identifying possible collective leakage attacks.

The responder 195 prevents the release of data from the retrieval database if the data leakage detector 190 identifies a potential data leakage attack. The responder 195 may be pre-configured with a range of response strategies to prevent the release of data when a potential data leakage attack is identified. The responder 195, for example, may halt suspicious queries, limiting query rates from the user or possibly for users with the same IP address or IP addresses within a range, or report the data leakage attack to system administrators for further action. The range of responses may depend on the nature and severity of the anomaly as identified by the data leakage detector 190. Absent identification of potential data leakage attack from the data leakage detector 190, the responder 195 permits retrieved data from the retriever 160 to be provided to the LLM 140 and the response to be transmitted to the user via the interface 120.

The LLM 140, the embedding model 150, the retriever 160, the collector 170, the analyzer 180, the data leakage detector 190, and/or the responder 195 are implemented in software, hardware, or a combination thereof. In some implementations, any one or more of the LLM 140, the embedding model 150, the retriever 160, the collector 170, the analyzer 180, the data leakage detector 190, or the responder 195 is embodied in instructions that, when executed by the processor 110, cause the system 100 to perform operations. In various implementations, the instructions of one or more of said components, the interface 120, the text database 134, and/or vector database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to RAG applications and data leakage detection are described with reference to the system 100, other suitable system configurations may be used.

Figure 2:
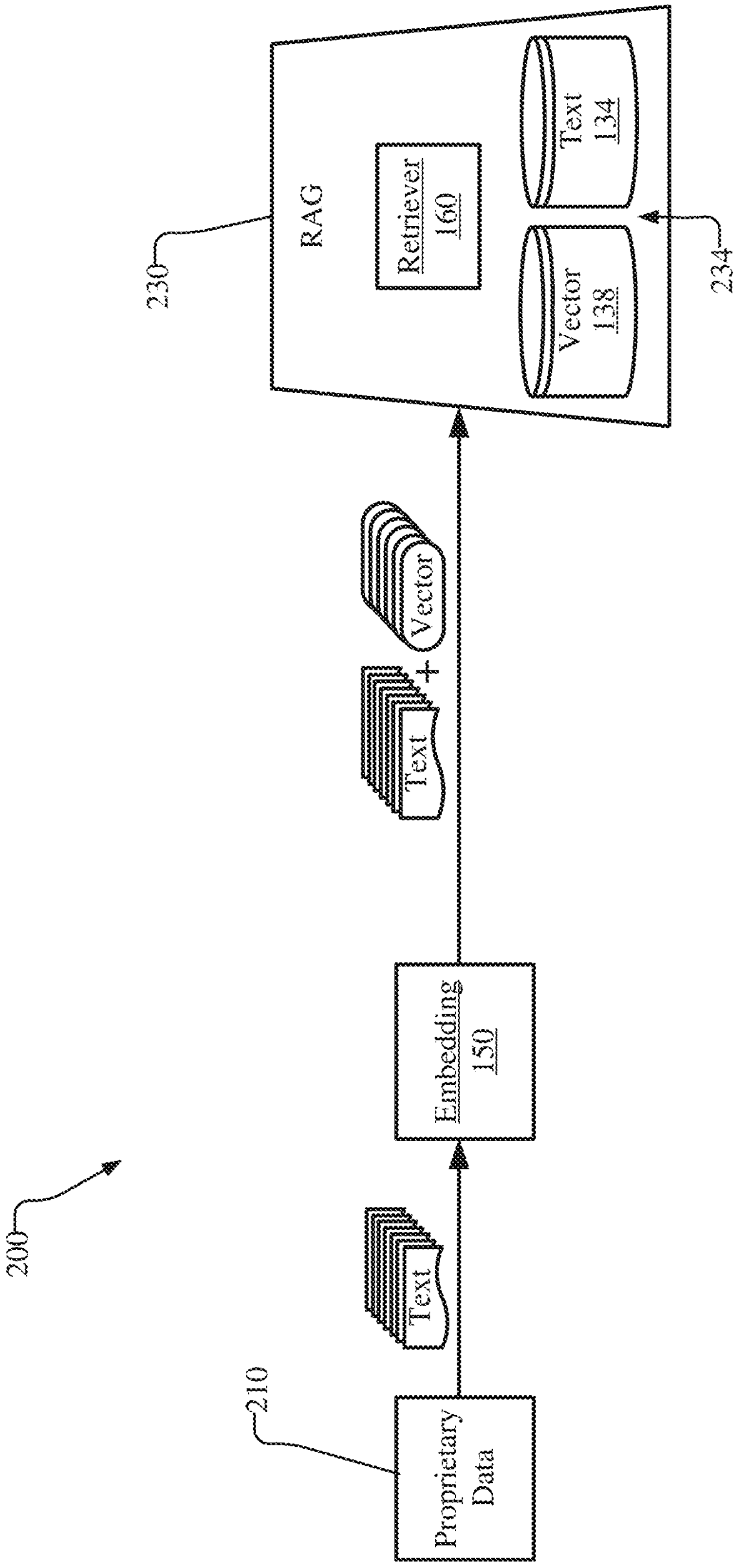
FIG. 2 illustrates an architecture for preparing a retrieval database in a RAG application.

FIG. 2 illustrates an architecture 200 for preparing a retrieval database 234 in a RAG application 230. As illustrated, the RAG application 230 includes the retriever 160 and the retrieval database 234, which includes the text database 134 and vector database 138. The vector database 138 and text database 134 may be a single database or linked databases with the vectors indexed to the associated text.

As illustrated in FIG. 2, proprietary data 210 is provided to an embedding model 150. The proprietary data 210, for example, may be textual items, by way of example, may include documents, articles, text snippets, sentences, JavaScript Object Notation (JSON) or YAML schemas, or any other item that is textual in nature, which are collectively sometimes referred to herein as text or documents. The proprietary data 210 may include private or confidential information or the collection of which was developed at private expense and is to be protected from general public access.

The embedding model 150 is a pre-trained model that converts text into fixed dimensional numeric vectors, sometimes referred to as embeddings. The embedding model 150 is trained to perform a function that operates on any item of text to yield its M dimensional embedding vector. The embedding model 150, for example, may be trained to maximize the similarity between queries and texts that are relevant to the queries, while minimizing the similarity between queries and texts that are irrelevant to the queries. The embedding model 150, for example, may be an off-the-shelf embedding model, which has been trained using generic training data.

The embedding model 150 operates on the text from the proprietary data 210 to convert the text into vectors, which are provided along with the associated text to the RAG application 230. The text and associated vectors are stored in the retrieval database 234, e.g., the vectors are stored in the vector database 138 and the associated text stored in the text database 134. The conversion of the text from the proprietary data 210 into vectors by the embedding model 150 and the storage of the resulting vectors and associated text in the retrieval database 234 may be a one-time operation, e.g., performed during initialization of the RAG application 230.

Figure 3:
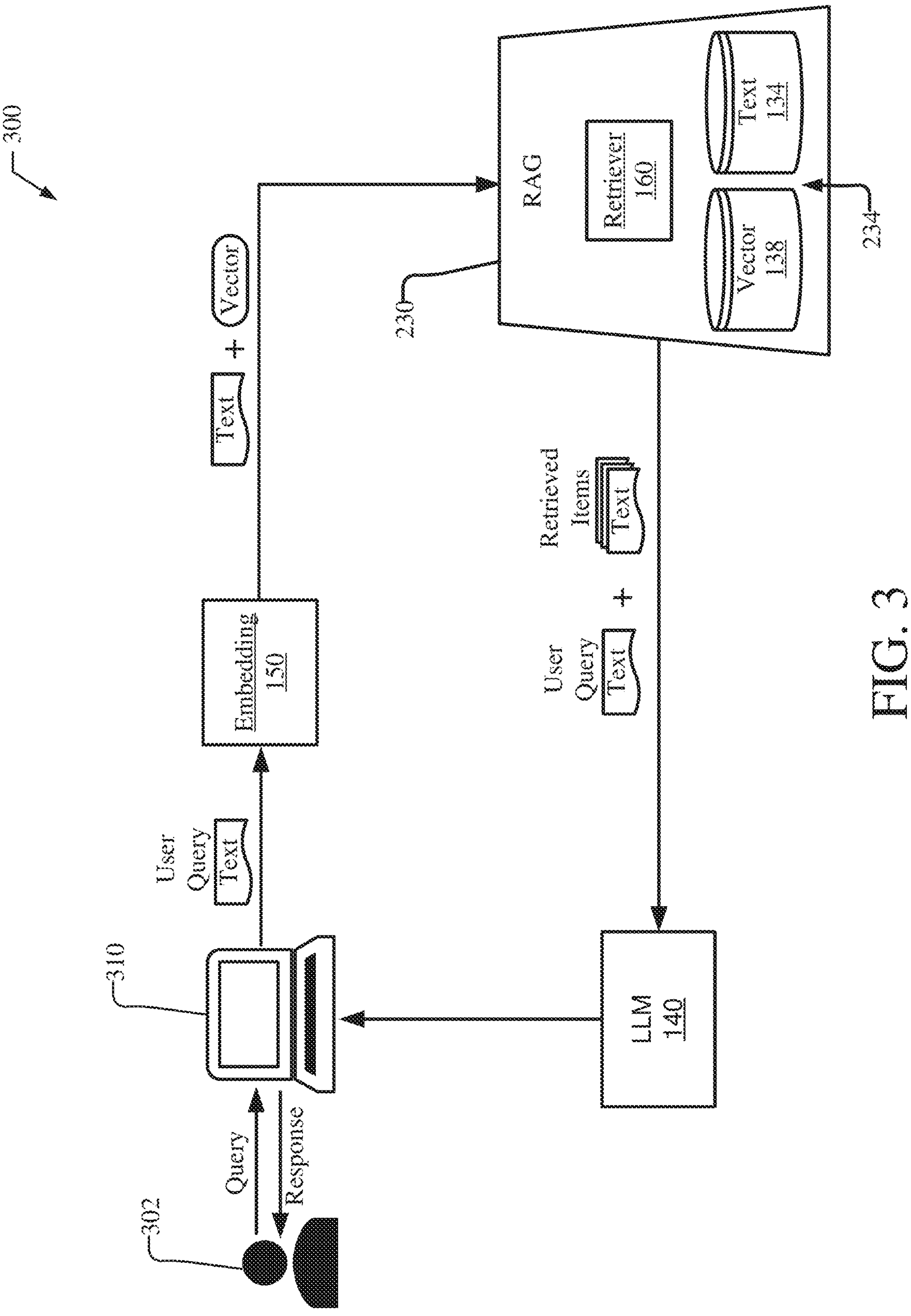
FIG. 3 illustrates an example architecture for responding to a user query by a RAG application with a GenAI application.

FIG. 3 illustrates an example architecture 300 for responding to a user query by a RAG application with a GenAI application. The architecture 300, for example, includes the embedding model 150 and RAG application 230 with the retrieval database 234 with proprietary data, illustrated in FIG. 2.

As illustrated, the embedding model 150 receives a user query from a computing device 310 from a user 302. The embedding model 150 converts the text from the user query into a fixed dimensional numeric vector, which is provided to the RAG application 230. The embedding model 150 is the same model used to convert the proprietary data text into vectors, which are stored in the retrieval database 234. The conversion of the user query text to a vector is performed in response to each user query.

The retriever 160 in the RAG application 230 is configured to perform a nearest neighbor search or vector search to find the closest K data points to a given query point in a high-dimensional vector space. The retriever 160 may implement any method or algorithm for nearest neighbor search, such as an exhaustive brute-force search as well as approximate nearest neighbor (ANN) search. The retriever 160 receives the query vector produced by the embedding model 150 and searches the vector database 138 for the nearest K embedding vectors. The retriever 160, for example, independently determines a distance score between the query vector and each vector stored in the vector database 138. The distance between the query vector and the text vectors stored in the vector database 138 may be determined using any desired distance metric, such as, but not limited to cosine distance, squared Euclidean distance, dot product, Manhattan distance, etc. The vectors with the least distance (or equivalently the highest similarity score) are considered the most relevant. The retriever 160, applying a nearest neighbor algorithm, determines the K nearest neighbors from the vector database 138 and retrieves the associated text from the text database 134, which may be produced ranked in order.

The user query and the retrieved items are provided by the RAG application 230 to the LLM 140. In some implementations, the RAG application 230 may include a prompt constructor that integrates, e.g., concatenates and/or injects, the retrieved text with the user query to form an LLM prompt. The LLM 140 receives the user query and retrieved items and provides a response to the computing device 310, which may be based on the data contained in the retrieved texts.

A non-malicious user 302 may submit multiple user queries, but typically the queries will be directed to retrieve a particular set of information. For example, the typical user 302 may iteratively revise and improve a query to retrieve information based on the response provided by the LLM. Accordingly, the user queries will typically produce similarities or distances to the nearest neighbors that improve, i.e., the distance decreases, over time. Moreover, while the user 302 is attempting to improve the query, the user queries will naturally be directed towards the same set of information. Accordingly, the user queries will typically attempt to retrieve data from the same general area in the vector space.

Figure 4A:
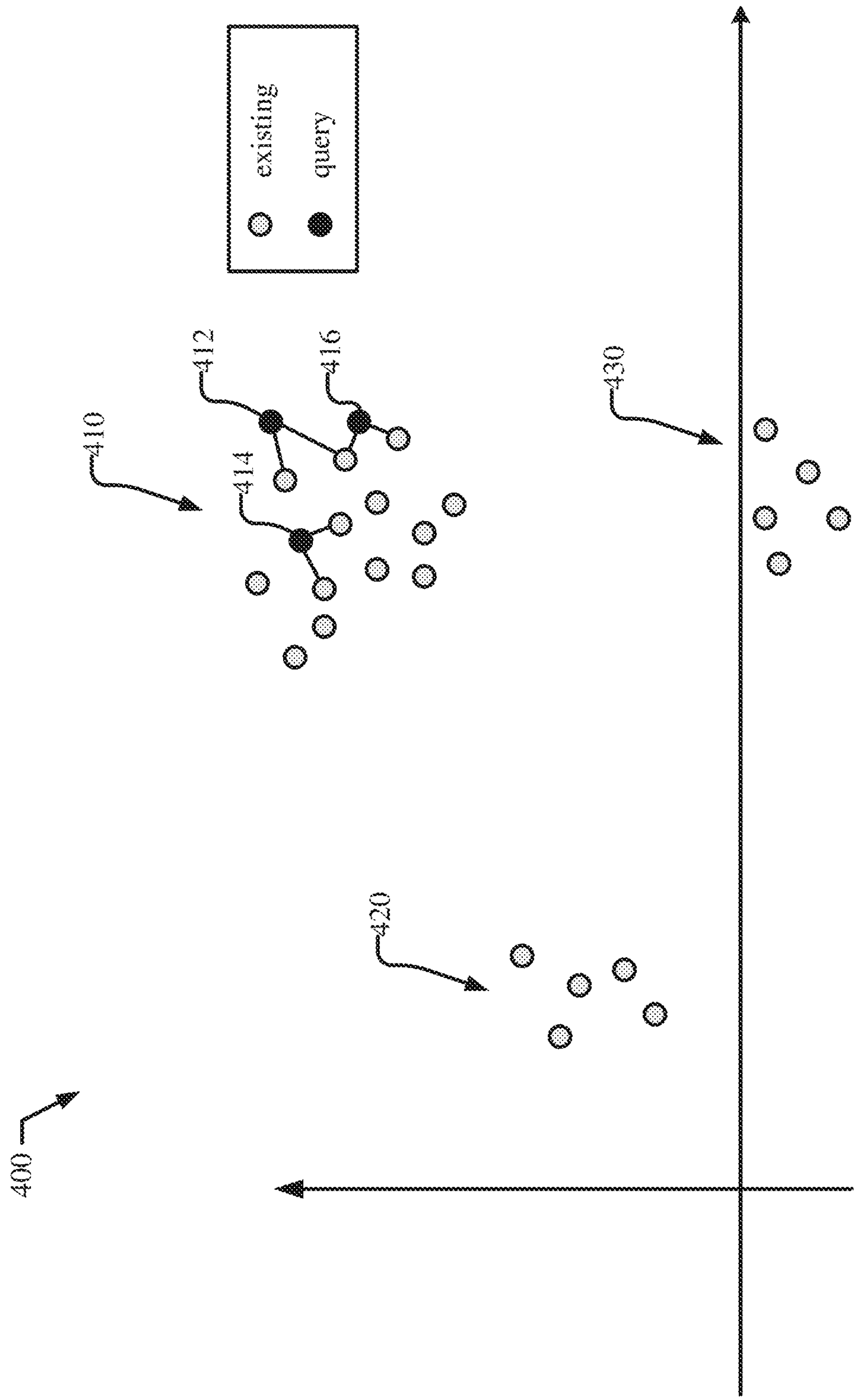
FIGS. 4A and 4B graphically illustrate a multi-dimensional vector space that may be used by RAG application and illustrate how query patterns from typical legitimate user may differ from the query pattern of a malicious user engaged in a collective leakage attack.
Figure 4B:
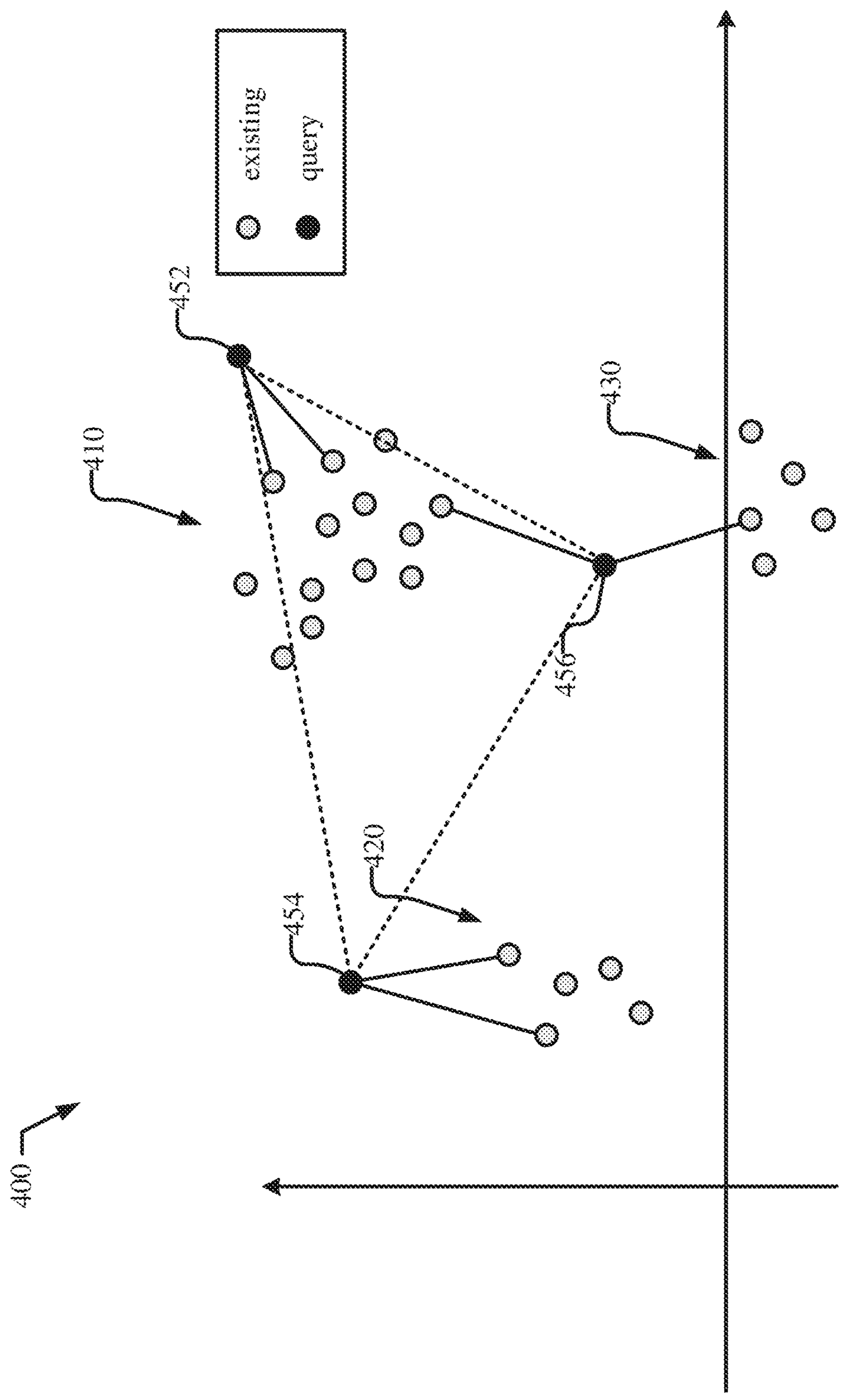

FIGS. 4A and 4B, by way of example, graphically illustrate a two-dimensional vector space 400 that may be used by RAG application 230 and illustrate how query patterns from typical legitimate user may differ from the query pattern of a malicious user engaged in a collective leakage attack. It should be understood that the embedding model 150 may convert text to a higher fixed dimensional vector space, but FIGS. 4A and 4B show a two-dimensional space for illustration. In FIGS. 4A and 4B, the grey dots represent existing data points in the vector space 400 occupied by the text vectors stored in the retrieval database 234, e.g., in the vector database 138. The vector space 400 may include clusters of existing data points, illustrated generally by clusters 410, 420 and 430. The black dots in FIGS. 4A and 4B represent the data points occupied by the query vectors in the vector space. The distance between the user queries and the two nearest neighbors are illustrated graphically with solid lines.

FIG. 4A illustrates an example of typical queries 412, 414, and 416 from a non-malicious user. As illustrated, the queries 412, 414, and 416 are in the same area in the vector space 400 near cluster 410, generally because the user is attempting to retrieve a particular set of information, which in this example resides in the area near cluster 410. Additionally, in general, the queries from a non-malicious user will typically result in similarity distances to the nearest neighbors that are relatively small or that improve over time. For example, the similarity distances to the nearest neighbors may improve by each successive query 412, 414, and 416. Of course, a legitimate user may submit queries that do not improve or have smaller similarity distances than previously submitted queries, but in general, if a user is attempting to legitimately use the database and retrieve a particular set of information, the similarity distances to the nearest neighbor points will generally improve, or at least not significantly worsen over time. Further, while a legitimate user may submit queries retrieve different sets of information that will result in queries that map to different areas of the vector space, in general, this is limited, and each query is likely to map to occupied regions of the vector space.

FIG. 4B, in contrast, illustrates an example of queries 452, 454, and 456 from a malicious user engaged in a collective leakage attack. An attacker, for example, may not be attempting to retrieve any particular set of information and, accordingly, the similarity distances to the nearest neighbor points produced by the queries may be relatively large compared to legitimate users, such as illustrated in FIG. 4A, and may not improve over time, as illustrated by the similarity distances from queries 452, 454, and 456 to each of their nearest neighbor points. Additionally, attackers may not be attempting to retrieve specific information, but instead are attempting to extract large amounts of non-specific data, e.g., unrelated data, from the retrieval database. The attackers, accordingly, may probe various areas in the database, resulting in queries that map to different regions in the vector space, as illustrated by queries 452, 454, and 456. The distribution of queries in the vector space may be analyzed for example based on the similarity distance between the queries themselves, as illustrated by the dotted lines in FIG. 4B. If the queries from an attacker are not directed to any particular information, but are simply probing the database, the queries may frequently map to sparse regions in the vector space, illustrated, for example, by the relatively large similarity distance between query 454 to its nearest cluster 420, which includes non-nearest neighbor datapoints, or the closest neighbors to query 456 residing in separate clusters 410 and 430.

Thus, the similarity distances associated with queries from each user may be analyzed to distinguish between normal and potentially malicious querying behavior to identify possible collective leakage attacks. For example, possible collective leakage attacks may be identified by analyzing the similarity distances of a user's queries to the K nearest neighbors in the vector space, which provides an indication, for example, of whether the user is actually attempting to legitimately retrieve specific information or attempting to extract any information from the retrieval database. Possible collective leakage attacks may additionally be identified by analyzing the similarity distances between each of a user's queries, which provides an indication, for example, of whether the user is attempting to legitimately retrieve specific information or attempting to extract information from different regions in the vector space. Additionally, possible collective leakage attacks may additionally be identified by analyzing the similarity distances between a user's queries and nearest cluster of datapoints in the vector space, which provides an indication, for example, of whether the user is attempting to legitimately retrieve specific information or attempting to extract information from different regions in the vector space. The analysis may be based on relatively simple metrics such as the central tendency of the similarity distances, e.g., at least one of an average, mean, median, and mode. Possible collective leakage attack may be identified by based one or more thresholds, such as a threshold number of queries from a user having similarity distances to nearest neighbors or other queries that exceed a predetermined distance threshold. In some implementations, the analysis may be performed by a machine learning model that is trained to identify possible collective leakage attacks based on similarity distances associated with queries from one or more users.

In some implementations, additional factors may be considered, such as historical data for each user. For example, the number of queries from each user, the frequency of queries, and the timing of queries may be used to assist in identifying a possible collective leakage attack. For example, the analysis or thresholds used for an established frequent user with no prior indications of possibly malicious query behavior may be different than the analysis or thresholds used for an unknown user. Other factors that may be considered may include the content of the query itself. For example, the queries may be analyzed to determine if they include adversarial input. Adversarial input, for example, is a language that is intended to deceive the RAG application into making incorrect predictions or decisions, such as retrieving large amounts of data or retrieving data from different regions in the vector dataspace. Adversarial input, for example, may be detected by the query containing gibberish or language intended to probe the retrieval database. Additionally, historical or contemporary data from other users may also be considered in the analysis to identify a possible collective leakage attack. For example, multiple users may be simultaneously probing the retrieval database, which may be identified based on the number of queries, the submission rate, and types of queries submitted by other users, e.g., particularly users with the same IP address or within an IP address range.

In some implementations, the analysis may be performed by a machine learning model that is trained to identify possible collective leakage attacks based on similarity distances associated with queries from one or more users. Supervised learning techniques, for example, may be used to train the machine learning model using known legitimate queries and malicious queries to distinguish between normal and suspicious query patterns. The machine learning model may evaluate key features, such as the similarity distances, and may use additional key features, such as the additional factors discussed above, to assist in identifying possible collective leakage attacks. The machine learning model, for example, may use decision trees, support vector machines, or neural networks.

Figure 5:
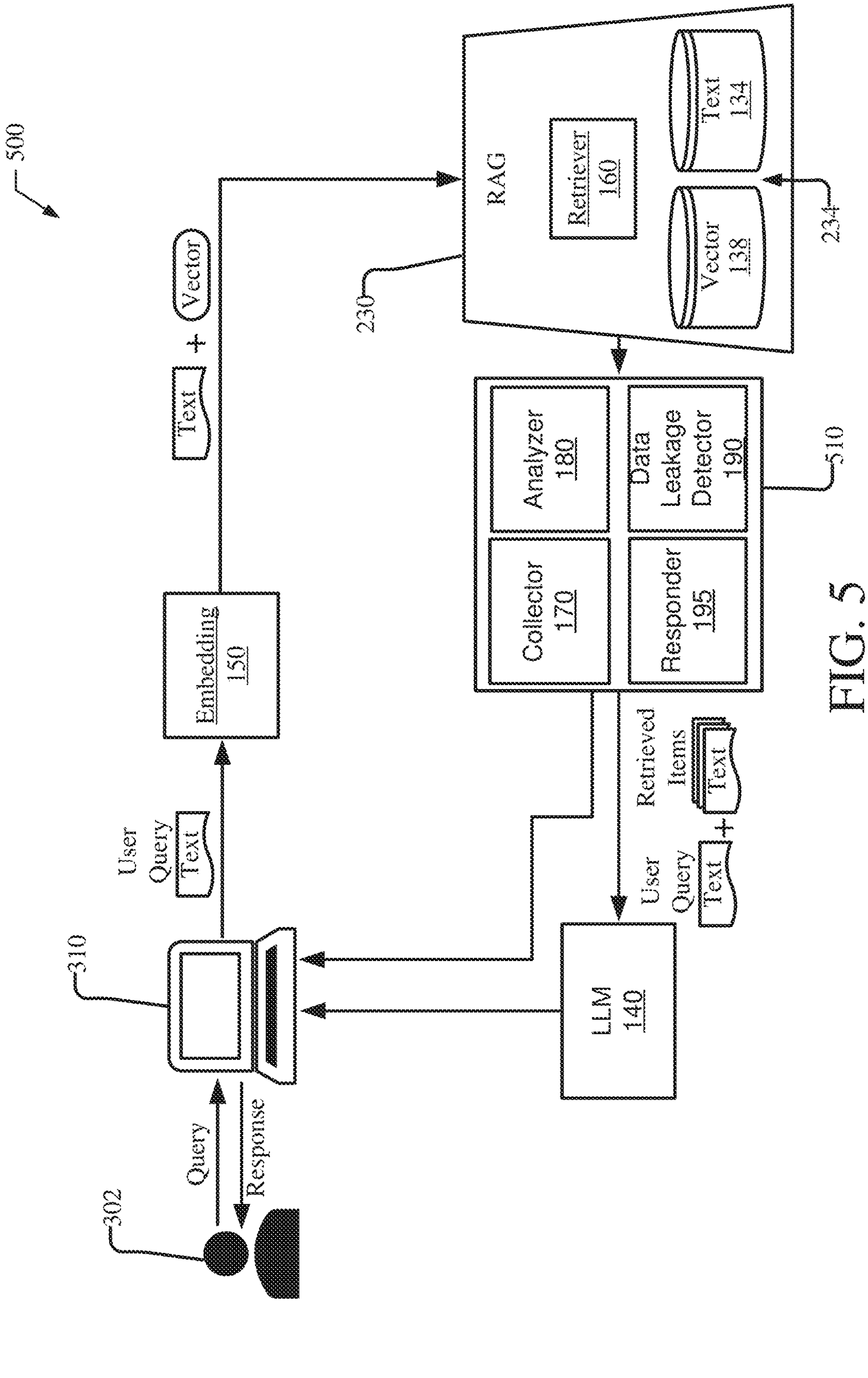
FIG. 5 illustrates an example architecture for data leakage detection for a RAG application with a GenAI application.

FIG. 5 illustrates an example architecture 500 for a RAG based response to a user query with data leakage detection, as discussed herein. Similar to FIGS. 2 and 3, the architecture 500, for example, may include the embedding model 150 and RAG application 230 with the retrieval database 234 with proprietary data, and the LLM 140, and additionally includes a data leakage detection system 510.

The data leakage detection system 510 includes the collector 170, the analyzer 180, the data leakage detector 190, and the responder 195. As discussed above, the collector 170 collects and logs details associated with each user query, which may be stored in a database 130, including a user identifier, the query and/or query vector embedding, and similarity distances associated with the query, e.g., the similarity distance to the K nearest neighbors, the similarity distance to other queries from the user, the similarity distance to the nearest cluster of datapoints in the vector space, etc. The collector 170 may collect and log additional details such as historical data for the user, including the number of queries, the frequency of queries, the timing of queries, whether adversarial input was detected in the query, the IP address associated with the computing device 310 that submitted the query, etc.

An analyzer 180 may process the query vector embedding to determine the similarity distances associated with the query, such as the similarity distance to the K nearest neighbors, the similarity distance to other queries from the user, the similarity distance to the nearest cluster of datapoints in the vector space, etc. The similarity distances may be determined using any desired distance metric, such as, but not limited to cosine distance, squared Euclidean distance, dot product, Manhattan distance, etc. The analyzer 180 may receive the query vector embedding from the RAG application 230 or from the embedding model 150. In some implementations, the analyzer 180 may be included in the retriever 160 in the RAG application 230, which searches the vector database 138 based on the vector embedding associated with the query. In some implementations, the analyzer 180 may determine the similarity distances from the query to other queries from the user, e.g., logged by the data collector.

A data leakage detector 190 uses the logged details for each query to identify outlier queries that may be indicative of exploratory or manipulative behaviors in each query that is consistent with a data leakage attempt. The data leakage detector 190 may consider one or more similarity distances associated with each query, such as the similarity distance to the K nearest neighbors, the similarity distance to other queries from the user, the similarity distance to the nearest cluster of datapoints in the vector space, etc., to identify data leakage attempts. The data leakage detector 190, for example, may apply one or more thresholds to the similarity distances associated with each query to determine whether the query is likely part of a data leakage attempt. The data leakage detector 190 may further consider additional factors, such as the historical data for the user associated with the query, including the number of queries, the frequency of queries, the timing of queries, and whether adversarial input was detected in the query. The data leakage detector 190 may further consider queries from other users, such as different users having the same IP address or within a range of IP addresses as the source of the query. In some implementations, the data leakage detector 190 may be a machine learning model, such as one or more decision trees, support vector machines, or neural networks, trained to distinguish between normal and suspicious query patterns to identify possible collective leakage attacks, e.g., based on one or more types of similarity distances associated with queries from one or more users. Supervised learning techniques, for example, may be used to train the data leakage detector 190 model using known legitimate queries and malicious queries to distinguish between normal and suspicious query patterns. The model may evaluate key features, such as the similarity distances, and may use additional key features, such as the historical factors as well as queries from other users to assist in identifying possible collective leakage attacks.

A responder 195 is activated when a potential data leakage attack is identified by the data leakage detector 190. The responder 195, for example, may be pre-configured with a range of response strategies to prevent the release of data from the RAG application 230 to the computing device 310 and user 302 when a potential data leakage attack is identified. Depending on the nature and severity of the anomaly, the response may include halting suspicious queries, limiting query rates from the user 302 or possibly for users with the same IP address or IP address within a range, or reporting the data leakage attack to system administrators for further action. On the other hand, if the data leakage detector 190 does not identify a potential data leakage attack, the user query and retrieved items from the RAG application 230 may be provided to the LLM 140, and the LLM 140 provides a response to the computing device 310, which may be based on the data contained in the retrieved texts.

Figure 6:
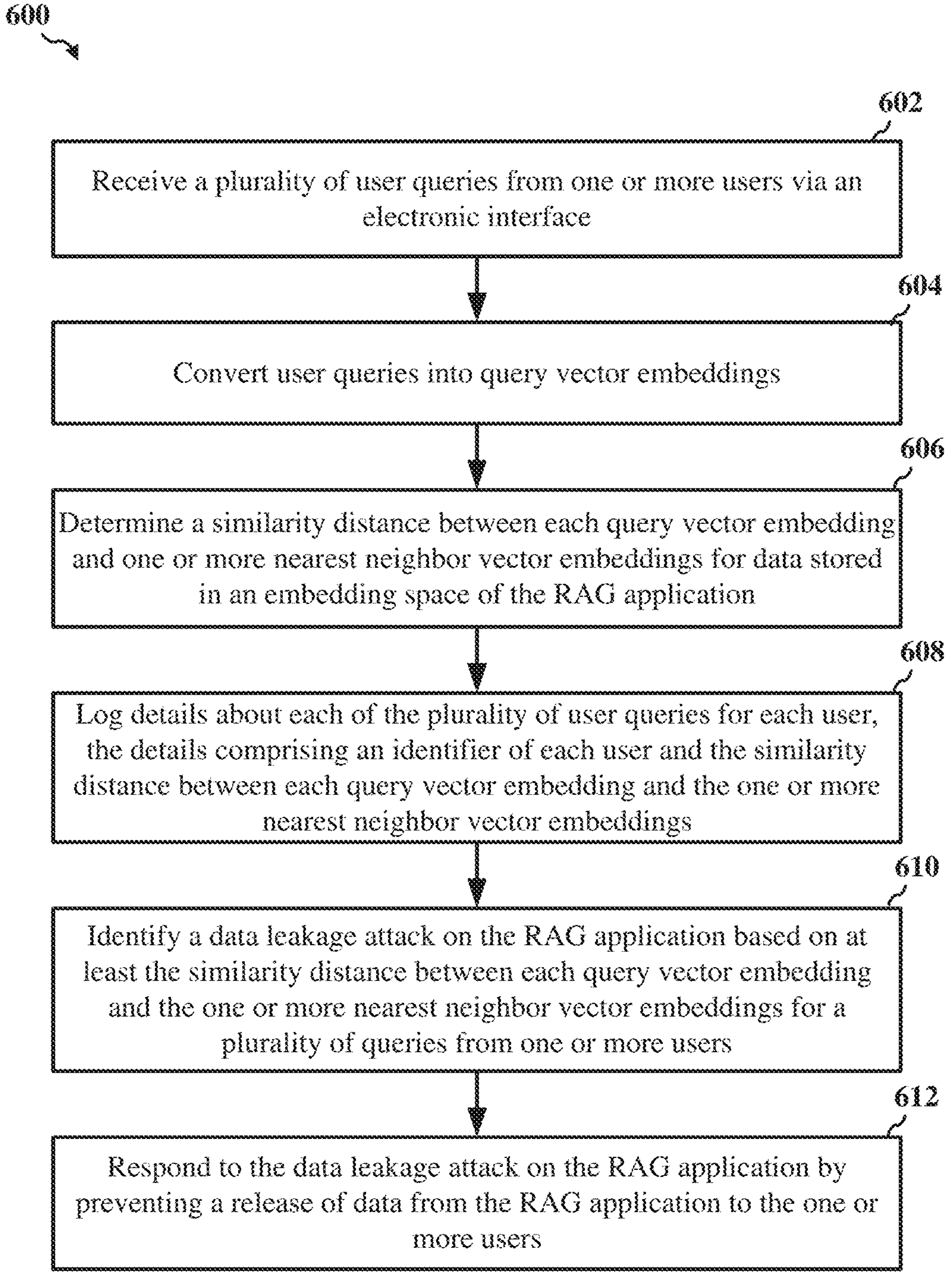
FIG. 6 shows an illustrative flowchart depicting an example method for preventing collective data leakage attacks on a RAG application for a GenAI application, according to some implementations.

FIG. 6 shows an illustrative flowchart depicting an example method 600 for preventing collective data leakage attacks on a Retrieval-Augmented Generation (RAG) application for a generative artificial intelligence (GenAI) application, according to some implementations. The example method 600 is described as a computer-implemented method, e.g., which may be performed by the system 100 illustrated in FIG. 1, e.g., configured with the architecture 500 shown in FIG. 5.

At 602, a plurality of user queries is received from one or more users via an electronic interface, e.g., as discussed in relation to the interface 120 shown in FIG. 1. The plurality of queries, for example, may be received over time.

At 604, the user queries are converted into query vector embeddings, e.g., as discussed in relation to the embedding model 150 shown in FIGS. 1, 2, 3, and 5.

At 606, a similarity distance is determined between each query vector embedding and one or more nearest neighbor vector embeddings for data stored in an embedding space of the RAG application, e.g., as discussed in relation to the analyzer 180, and in some implementations, the retriever 160, in FIGS. 1, 3, and 5. In some implementations, for example, a similarity distance between each query vector embedding and one or more nearest neighbor vector embeddings is determined using at least one of one of a cosine distance, a Euclidean distance, a squared Euclidean distance, a vector dot product, and a Manhattan distance.

At 608, details are logged about each of the plurality of user queries for each user, where the details include an identifier of each user and the similarity distance between each query vector embedding and the one or more nearest neighbor vector embeddings, e.g., as discussed in relation to the collector 170 and database 130 in FIGS. 1 and 5.

At 610, a data leakage attack on the RAG application is identified based on at least the similarity distance between each query vector embedding and the one or more nearest neighbor vector embeddings for a plurality of queries from one or more users, e.g., as discussed in relation to the data leak detector 190 in FIGS. 1 and 5. In some implementations, the data leakage attack on the RAG application may be identified based on changes in the similarity distances over time.

At 612, the system responds to the data leakage attack on the RAG application by preventing a release of data from the RAG application to the one or more users, e.g., as discussed in relation to the responder 195 in FIGS. 1 and 5. In some implementations, for example, the system may respond to the data leakage attack on the RAG application by at least one of stopping queries from users identified as submitting queries in the data leakage attack, limiting query rates for users identified as submitting queries in the data leakage attack, reporting the data leakage attack to system administrators.

In some implementations, the details about each of the plurality of user queries for each user may further include at least one of a number of queries from each user, a frequency of queries from each user and a timing of queries from each user relative to queries from other users. Additionally, the data leakage attack on the RAG application may be identified further based on at least one of a number of queries from each user, the frequency of queries from the one or more users, and the timing of queries from the one or more users.

In some implementations, the method may further include determining whether the user queries include adversarial input, and the data leakage attack on the RAG application may be identified further based on a presence of adversarial input in queries from the one or more users.

In some implementations, a central tendency of the similarity distances between the query vector embeddings and the one or more nearest neighbor vector embeddings for the plurality of queries from each user may be determined. The central tendency of the similarity distances, for example, may be at least one of an average, mean, median, and mode. The data leakage attack on the RAG application may be identified based on identification of one or more outlier queries based on the central tendency of the similarity distance.

In some implementations, the method may further include determining a similarity distance between query vector embeddings from each user, e.g., as discussed in relation to FIGS. 4A and 4B. The data leakage attack on the RAG application may be identified further based on the similarity distance between the query vector embeddings from the one or more users.

In some implementations, the method may further include determining a similarity distance between each query vector embedding and nearest neighbor cluster of vector embeddings for the data stored in the embedding space of the RAG application, e.g., as discussed in relation to FIGS. 4A and 4B. The data leakage attack on the RAG application may be identified further based on the similarity distance between the query vector embeddings and nearest neighbor cluster of vector embeddings for the one or more users.

In some implementations, the data leakage attack on the RAG application may be identified using a machine learning model trained to distinguish normal and suspicious query patterns based at least on the similarity distances between query vector embeddings and nearest neighbor vector embeddings.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "generating," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the broadest scope consistent with this disclosure, the principles and the novel features disclosed herein.

What is claimed is:

1. A method of preventing collective data leakage attacks on a Retrieval-Augmented Generation (RAG) application for a generative artificial intelligence (GenAI) application, the method comprising:

receiving a plurality of user queries from one or more users via an electronic interface;

converting user queries into query vector embeddings;

determining a similarity distance between each query vector embedding and one or more nearest neighbor vector embeddings for data stored in an embedding space of the RAG application;

logging details about each of the plurality of user queries for each user, the details comprising an identifier of each user and the similarity distance between each query vector embedding and the one or more nearest neighbor vector embeddings;

identifying a collective data leakage attack on the RAG application by a user based on a plurality of user queries from the user using at least the similarity distance between each query vector embedding and the one or more nearest neighbor vector embeddings for the plurality of user queries from the user; and responding to the collective data leakage attack on the RAG application by the user by preventing a release of data from the RAG application to the user.

2. The method of claim 1, wherein determining a similarity distance between each query vector embedding and one or more nearest neighbor vector embeddings comprises determining at least one of a cosine distance, a Euclidean distance, a squared Euclidean distance, a vector dot product, and a Manhattan distance.

3. The method of claim 1, wherein the details about each of the plurality of user queries for each user further comprise at least one of a number of queries from each user, a frequency of queries from each user and a timing of queries from each user relative to queries from other users, and wherein identifying the collective data leakage attack on the RAG application by the user is further based on at least one of a number of queries from the user, the frequency of queries from the user, and the timing of queries from the user.

4. The method of claim 1, the method further comprising determining whether the user queries include adversarial input, and wherein identifying the collective data leakage attack on the RAG application by the user is further based on a presence of adversarial input in one or more queries from the user.

5. The method of claim 1, further comprising determining a central tendency of the similarity distances between the query vector embeddings and the one or more nearest neighbor vector embeddings for the plurality of user queries from the one or more users, the central tendency of the similarity distances comprises at least one of an average, mean, median, and mode, and wherein identifying the collective data leakage attack on the RAG application by the user is based on identification of one or more outlier queries from the user based on the central tendency of the similarity distances.

6. The method of claim 1, further comprising determining a similarity distance between query vector embeddings from each user, wherein identifying the collective data leakage attack on the RAG application by the user is further based on the similarity distance between the query vector embeddings from the user.

7. The method of claim 1, further comprising determining a similarity distance between each query vector embedding and nearest neighbor cluster of vector embeddings for the data stored in the embedding space of the RAG application, wherein identifying the collective data leakage attack on the RAG application by the user is further based on the similarity distance between the query vector embeddings and nearest neighbor cluster of vector embeddings for the user.

8. The method of claim 1, wherein identifying the collective data leakage attack on the RAG application by the user is based on changes in the similarity distances for the plurality of user queries from the user over time.

9. The method of claim 1, wherein identifying the collective data leakage attack on the RAG application by the user uses a machine learning model trained to distinguish normal and suspicious query patterns based at least on the similarity distances between query vector embeddings and nearest neighbor vector embeddings.

10. The method of claim 1, wherein responding to the collective data leakage attack on the RAG application by the user by preventing the release of data from the RAG application to the user comprises at least one of stopping queries from the user, limiting query rates for the user, and reporting the collective data leakage attack to system administrators.

11. A system configured for preventing collective data leakage attacks on a Retrieval-Augmented Generation (RAG) application for a generative artificial intelligence (GenAI) application, the system comprising:

one or more processors; and at least one memory coupled to the one or more processors and storing instructions that, when executed by the one or more processors, cause the system to perform operations including:

receiving a plurality of user queries from one or more users via an electronic interface;

converting user queries into query vector embeddings;

determining a similarity distance between each query vector embedding and one or more nearest neighbor vector embeddings for data stored in an embedding space of the RAG application;

logging details about each of the plurality of user queries for each user, the details comprising an identifier of each user and the similarity distance between each query vector embedding and the one or more nearest neighbor vector embeddings;

identifying a collective data leakage attack on the RAG application by a user based on a plurality of user queries from the user using at least the similarity distance between each query vector embedding and the one or more nearest neighbor vector embeddings for the plurality of user queries from the user; and responding to the collective data leakage attack on the RAG application by the user by preventing a release of data from the RAG application to the user.

12. The system of claim 11, wherein the execution of the instructions causes the system to determine the similarity distance between each query vector embedding and one or more nearest neighbor vector embeddings by determining at least one of a cosine distance, a Euclidean distance, a squared Euclidean distance, a vector dot product, and a Manhattan distance.

13. The system of claim 11, wherein the details about each of the plurality of user queries for each user further comprise at least one of a number of queries from each user, a frequency of queries from each user and a timing of queries from each user relative to queries from other users, and the execution of the instructions causes the system to identify the collective data leakage attack on the RAG application by the user further based on at least one of a number of queries from the user, the frequency of queries from the user, and the timing of queries from the user.

14. The system of claim 11, wherein execution of the instructions causes the system to perform operations further including determining whether the user queries include adversarial input, and the execution of the instructions causes the system to identify the collective data leakage attack on the RAG application by the user further based on a presence of adversarial input in one or more queries from the user.

15. The system of claim 11, wherein execution of the instructions causes the system to perform operations further including determining a central tendency of the similarity distances between the query vector embeddings and the one or more nearest neighbor vector embeddings for the plurality of user queries from the one or more users, the central tendency of the similarity distances comprises at least one of an average, mean, median, and mode, and the execution of the instructions causes the system to identify the collective data leakage attack on the RAG application by the user further based on identification of one or more outlier queries from the user based on the central tendency of the similarity distances.

16. The system of claim 11, wherein execution of the instructions causes the system to perform operations further including determining a similarity distance between query vector embeddings from each user, and the execution of the instructions causes the system to identify the collective data leakage attack on the RAG application by the user further based on the similarity distance between the query vector embeddings from the user.

17. The system of claim 11, wherein execution of the instructions causes the system to perform operations further including determining a similarity distance between each query vector embedding and nearest neighbor cluster of vector embeddings for the data stored in the embedding space of the RAG application, and the execution of the instructions causes the system to identify the collective data leakage attack on the RAG application by the user further based on the similarity distance between the query vector embeddings and nearest neighbor cluster of vector embeddings for the user.

18. The system of claim 11, wherein the execution of the instructions causes the system to identify the collective data leakage attack on the RAG application by the user based on changes in the similarity distances for the plurality of user queries from the user over time.

19. The system of claim 11, wherein the execution of the instructions causes the system to identify the collective data leakage attack on the RAG application by the user using a machine learning model trained to distinguish normal and suspicious query patterns based at least on the similarity distances between query vector embeddings and nearest neighbor vector embeddings.

20. The system of claim 11, wherein the execution of the instructions causes the system to respond to the collective data leakage attack on the RAG application by the user by preventing the release of data from the RAG application to the user comprises at least one of stopping queries from the user, limiting query rates for the user, and reporting the collective data leakage attack to system administrators.

* * * * *